United States Patent Office 3,321,568
Patented May 23, 1967

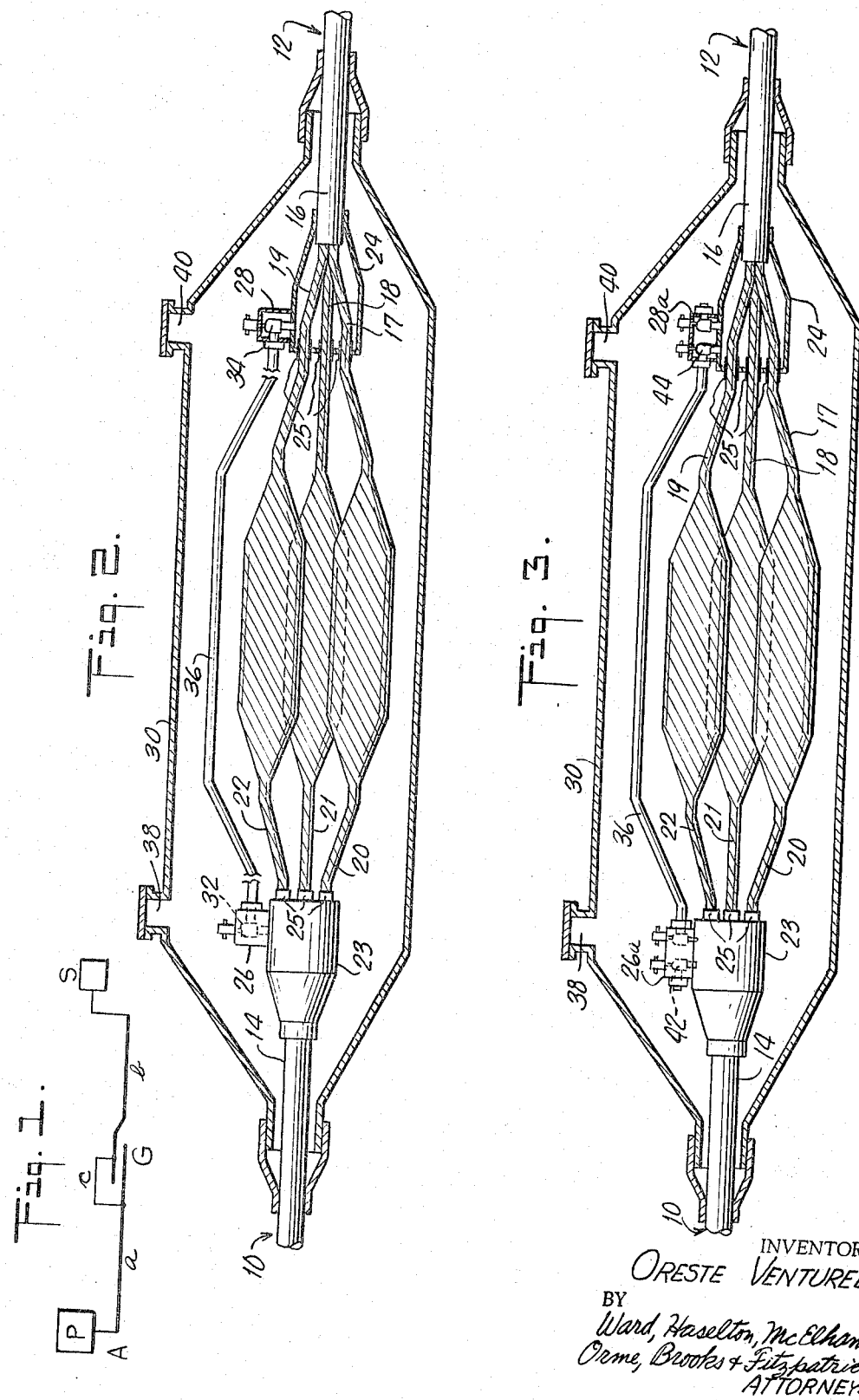

3,321,568
METHOD AND APPARATUS FOR JOINING TOGETHER SECTIONS OF OIL-FILLED CABLE
Oreste Venturelli, Milan, Italy, assignor to Pirelli Societa per Azioni, Milan, Italy, a corporation of Italy
Filed Apr. 1, 1964, Ser. No. 356,367
Claims priority, application Italy, Apr. 10, 1963, 7,399/63
10 Claims. (Cl. 174—21)

This invention relates to a method and apparatus for joining together sections of oil filled cable, such as multiple core electrical cable. By means of the present invention, the cable sections to be joined can be continuously supplied with oil from a single supply source disposed at one end of the line.

In joining sections of oil filled cables, it is necessary, during the joining operation, to maintain a positive or above atmospheric pressure on the oil contained in the cable, in order to prevent penetration of air which would affect the dielectric properties of the cable insulation. Consequently, it is also necessary to maintain a continued supply of oil to each of the various sections to be joined.

In certain cases, electrical power is transmitted over a group of single core powered cables (which group may comprise two or three cables, depending upon the phasing of the transmitted power). In these case, the cables are laid in the ground with the cable lengths being made as equal as possible. The first sections of each cable are connected to an oil supply source; all the successive sections of each cable are temporarily interconnected by means of an oil tube coupled to dispatch heads at the ends of each section. This provides for each cable in the group, a continuous oil flow path along its successive sections.

When it is desired to make or to place a connection or joint in one of these single core cables, as it is necessary to have a free access to the conductor cores, the dispatch heads which had been temporarily connected with a tube, are to be removed from the two ends of the cable sections to be joined; in this way the continuity of the oil channels of each cable is interrupted. In order that, even during the construction of the joints, generally carried out singularly, all the sections be fed with oil, the single terminal sections of the cables—namely those disposed at the end opposite to the end connected with the oil supply sources—are connected to one another, using the dispatch head, by means of an additional conduit. In this way it is possible to maintain a continuous flow of oil to both of the cable sections to be joined, as the section at one side of the joint is directly connected to the oil supply source, whilst the section at the other side, by means of the above indicated oil conduit, is supplied by the oil supply sources disposed at the end of the other cables. This method may be applied also to three-phase cables, provided that they be constituted at least by a group of two.

Where however, the electrical power is transmitted, not over a group of cables, but rather over a single cable containing a group such as two or three cores, the above described process cannot be adopted since there is really only one oil flow path, constituted by several parallel channels, through the entire cable; and any opening of the cable between successive sections would interrupt oil flow along all of its various cores. As a result, it has been necessary in these cases to provide additional oil supply sources at opposite ends of the cable in order to maintain a positive oil pressure within the individual sections on each side of the connection or joint and to insure adequate replacement of any oil lost during the joining operation. This has proved quite unsatisfactory due to the fact that the multi-core cable, by virtue of its parallel oil flow channels, has a longitudinal resistance to oil flow which is far lower than that of single core cables. Further, during the connecting operation, all of the parallel oil flow channels are opened at the same time, thus permitting a free outflow of oil. Because of this, it has been necessary to provide very large oil supply sources along with the usual associated high capacity degassing equipment. Such equipment is bulky and often difficult to move from place to place to follow the laying of the cable. Also, it is often extremely difficult to provide adequate facilities for the connecting of the oil supply source to the electricity sources necessary for its working.

According to one feature of the present invention, it is possible to make or replace a connection on a multiple core oil filled cable such as a three phase cable with a single oil supply source disposed on one end of the line. Furthermore, the method and apparatus of the present invention permits such connection to be made with a minimum loss of oil from the line.

In carrying out the present invention, the ends of the cable to be joined are provided with trifurcating boxes which are located within a common joint casing. The ends of the cable sections being joined penetrate through the ends of the respective trifurcating boxes and their various cores are electrically connected within the joint casing. The trifurcating boxes are provided with oil ducts having valves therein for controlling the flow of oil through them. These ducts extend into the trifurcating boxes and communicate between the oil filled portion of their respective cable section and the interior of the joint casing. The ducts on the two trifurcating boxes are interconnected through an oil tube which maintains a continuity of oil flow between the cable sections; while at the same time permitting free access to the ends of the conductors or cores for making connections therebetween.

Further details of the present invention will be understood from the following description, given by way of illustrative example, which description should be considered in conjunction with the accompanying drawings in which:

FIG. 1 represents the diagram of the oil supply of a multi-core cable in accordance with the present invention:

FIG. 2 is a cross section view illustrating one form of a cable joint constructed according to the present invention; and FIG. 3 represents a modified version of the improved joint shown in FIG. 2.

FIGURE 1 represents the diagram of the oil supply for a multi-core cable in accordance with the present invention, which ensures the continuity of the oil ducts between the two cable sections to be joined; in this way, by means of an oil supply source P disposed at the end A, besides supplying the section a, directly connected to it, it is possible to supply through the tube c also the section b, for which it is sufficient to provide at the other end a simple variable pressure tank, like those conventionally used for maintaining the oil pressure in an oil-filled cable wound on the shipping drum. In fact said tank must supply only an amount of oil corresponding to that which outflows from the cable during the short operations necessary for the application of the trifurcating boxes and has not to work during all the operations required to carry out the jointing, which involve a considerably longer time.

FIG. 2 illustrates one joining arrangement according to the present invention, such arrangement being suited to couple together two sections of three phase (3 core) oil filled electrical cable. As shown in the drawing, there are provided two cable sections 10 and 12, to be joined, each section comprising an outer metal sheath, 14 and 16, which enclose, respectively, a number of separately wrapped cores 17–19 and 20–22 immersed in a common bath of oil maintained under pressure within the outer sheath. In joining these sections together according to the present invention, the outer metal sheath 14 and 16 is stripped away from the end of each cable section, thus exposing the various electrical cores thereof. After removing the outer sheath, two trifurcating boxes 23 and 24 are assembled onto the exposed ends of the cable sections. These trifurcating boxes are hollow tubular connector elements which are sealably connected to the end of each metal sheath, as by soldering. The individual cores of each cable protrude through corresponding openings at the opposite end of each trifurcating box and are sealed thereto by means of rubber elements or grommets 25 which surround the individual cores. The trifurcating boxes, it will be appreciated, act as a seal between the outer covering and the cores of each cable. These boxes are each provided with a connecting member 26 and 28 which carries a duct or fluid passageway which places the inside of the trifurcating box into communication with the outer space surrounding the cables. In this manner, the seal set up by the box may be effectively bypassed via the ducts therein. The outer space surrounding the exposed cable cores is enclosed by an outer metal casing 30 which extends over the trifurcating boxes and is sealably attached to the metal cable sheath 14 and 16 of each of the connected cable sections. The oil flow from within each cable section to the space enclosed by the outer casing is controlled by valves 32 and 34 located on each of the connecting members 26 and 28. While the trifurcating boxes are being assembled on the cable ends, these valves are closed to prevent oil leakage.

A bypass tube 36 is connected between the ducts of each of the respective connecting members 26 and 28. The valves 32 and 34 are then opened to place the two cable sections into fluid communication via the trifurcating boxes 23 and 24 and the bypass tube 36. In this way, it is possible to provide and maintain a supply of oil to each cable section even when the outer casing 30 and the electrical cable connections are removed. Also, when a new cable joint is being effected, the bypass tube connection can be made quickly and prior to any electrical work being done on the cable sections so that the more time consuming process of wrapping the various electrical connections can be carried out without the need for undue haste.

When the electrical connections are made and wrapped in the usual manner, the outer metal casing 30 may then be assembled. This casing as shown is provided with two openings 38 and 40 which are sealed in normal use but which may be opened in order to facilitate access to the valves 32 and 34 on the trifurcating box connecting members 26 and 28.

After wrapping the electrical cores, the wrappings are dried and subsequently impregnated. Because of the fact that the drying operation requires a long application of very high vacuum inside of the outer casing 30, it often occurs that oil will seep through the core insulation and into the outer casing 30. Although this has the effect of reducing oil pressure within the two cable sections being joined, a single oil supply source, connected to one cable section, can continue to replenish both cable sections via the bypass tube 36.

After connecting the two cable sections as above described, the bypass tube 36 can be removed through either or both of the openings 38 and 40 in the outer casing, either by disassembling them from the connecting members 26 and 28, or simply by severing the tube at points near the connecting members. During this time, the valves 32 and 34 are kept open so that the oil passage from one cable section to the next is maintained via inner space surrounded by the outer casing 30. This permits a proper supply of oil to the region of the electrical connections during normal operation of the cable. After the bypass tube 36 has been removed and oil fills up the outer casing, the openings 38 and 40 are then tightly closed.

The modification of FIG. 3 shows a bypass tube arrangement between the two trifurcating boxes 23 and 24 which may be maintained intact after completion of the cable connection, and yet will provide the necessary oil supply to the core connections during operation of the cable. In the arrangement of FIG. 3, the connecting members 26a and 28a on the two trifurcating boxes inside the outer casing 30 are provided with additional ducts whose flow is adjusted by means of secondary valves designated respectively at 42 and 44. The additional ducts instead of communicating between the interior of the trifurcating boxes and the bypass tube, communicate between the interior of such trifurcating boxes and the space surrounded by the outer casing 30. Means may be provided in conjunction with the outer casing so as to control the various valves on the connecting boxes from a point outside the outer casing. For example, one of such means might comprise elongated valve stems which extend from the valves out through the casing itself. These stems may be pressure sealed by means of packing rings. Also, the outer casing may simply be provided with openings similar to that shown in FIG. 1 through which tools may be inserted to control the various valves associated with the trifurcating boxes. After adjustment of these valves, the openings on the outer casing may be tightly closed.

It will of course be understood that during assembly of the joint or cable connection, the secondary valves 42 and 44 must be closed so that oil flow between the two cable sections being joined takes place via the bypass tube 36.

After the drying and impregnating operations, instead of removing the bypass tube as described previously, the secondary valves 42 and 44 are simply opened; and in this way a supply of oil to the region of the electrical core connections is obtained. Thus, at the completion of the joining operation, all of the valves in each trifurcating box are in their opened condition.

It will be appreciated that because of the improved joining concept described herein, it is possible, by suitable adjustment of the various valves, to place the outer casing 30 into communication with either a single cable section or with both sections. Also, in normal conditions, it is possible to supply the outer casing 30 from only one or from both cable sections entering therein. If desired, both cable sections can be supplied through the outer casing itself as by connecting it to a suitable oil supply source. Furthermore, when it is desired to provide access to the electrical connections within the outer casing, such casing can be removed without interruption of the oil supply so that the efficiency of oil supply is maintained.

Although particular embodiments of the invention are herein disclosed for purposes of explanation, further modifications thereof, after study of this specification, will be apparent to those skilled in the art to which the invention pertains. Reference should accordingly be had to the appended claims in determining the scope of the invention.

What is claimed and desired to be secured by Letters Patent is:

1. A process for joining together sections of a multi-core oil-filled electrical cable in a manner so as to maintain a supply of oil to each section to be joined during the joining, while using a single oil supply disposed at one end of the cable, which comprises the following steps: cutting and removing the outer covering of the cable at the end of the two cable sections to be joined; separating the exposed cable cores in each section; applying trifurcating boxes between the end of the cut outer coverings and the separated cable cores of each cable section; connecting the inside of each trifurcating box to the other by means of a bypass tube; and allowing oil flow from within one of said trifurcating boxes through said tube and into the other trifurcating box; executing the electric connections between corresponding conductors of each core and applying the insulating and screening wrappings; applying an enclosing joint casing; drying and impregnating the wrapped and connected cores within the casing, and thereafter connecting the inside of each trifurcating box to the interior of said joint casing.

2. The process described in claim 1 wherein the bypass tube is removed from the joint casing after the drying and impregnating operations and thereafter sealing said casing.

3. A device for joining a three-phase oil-filled electrical cable, said device comprising a pair of trifurcating boxes, two connecting members, each disposed on a trifurcating box and in communication with it, each of said connecting members being provided with first and second ducts extending from the interior of the trifurcating box and adapted to provide for the flow of oil, each duct being further provided with a suitable opening and closing valve, a by-pass tube connecting the first duct of the two connecting members and a joint casing enclosing said boxes, each of said second ducts extending between the interior of its associated trifurcating box and the interior of said joint casing.

4. A joint for a three-phase oil-filled electrical cable, said joint comprising an outer casing, trifurcating boxes assembled at the ends of the cable sections to be joined, and enclosed by said outer casing, connecting members, each mounted on one of the trifurcating boxes, each of said connecting members being provided with two ducts having separate opening and closing valves, and extending to the interior of the associated trifurcating box, a bypass tube connecting a duct of one connecting member with a duct of the other, the two remaining ducts providing a communication between the interior of each trifurcating box and the interior of the joint casing, and said casing being provided with means providing access to and permitting operation of said valves from a point external to said casing.

5. In combination with a pair of oil-filled electrical cables having a plurality of cores encased within an oil-filled outer covering, a connector construction comprising, a hollow outer shell sealed at each end to the outer covering of each of said cables, a pair of tubular connectors each sealably connected at one end to the outer covering of a respective one of said cables within said outer shell, the other end of said tubular connectors sealably contacting protruding extensions of the cores of said cables, fluid conduit means associated with and interconnecting the interior of each of said tubular connectors, and adjustable valve means arranged to open the interior of said connectors to the interior of said hollow outer shell.

6. A connector construction as in claim 5 wherein said outer shell is provided with sealable openings in the vicinity of said valve means for obtaining exterior control of said valve means.

7. A connector construction as in claim 5 wherein said valve means includes the means for controlling the flow of fluids through said fluid conduit means.

8. A connector construction as in claim 7 wherein said means in said fluid conduit means includes a separate valve element located at each of said tubular connectors.

9. In combination with a pair of oil-filled electrical cables having a plurality of cores encased within an oil-filled outer covering, a connector construction comprising, a hollow outer shell sealed at each end to the outer covering of each of said cables, a pair of tubular connectors each sealably connected at one end to the outer covering of a respective one of said cables within said outer shell, the other end of said tubular connectors sealably contacting protruding extensions of the cores of said cables, first and second fluid conduit means associated with and leading from the interior to the exterior of each of said tubular connectors, a bypass tube connecting each of said first fluid conduit means, and adjustable valve means associated with each of said fluid conduit means for controlling the flow of oil therethrough, said valve means being adapted for adjustment from points exterior to said outer shell.

10. A process for making a connection between two oil-filled electrical cables, each having a plurality of cores and an outer covering with a minimum loss of oil, said process comprising the steps of removing from the ends of the cables to be joined a length of the outer covering of each of said cables, attaching to each of said cables a tubular inner connector in fluid tight relation with one end of each inner connector and the end of the outer covering of its respective cable and in fluid tight relation with the opposite end of each inner connector and the cores of each cable with the ends of said cores protruding therethrough, providing a fluid coupling between the interiors of the tubular connectors, electrically connecting the cores of one cable to the corresponding cores of the other cable, placing a hollow outer shell around said cable ends and said tubular inner connectors in sealing relationship to the outer coverings of said cable sections, and placing the interior of each of said tubular inner connectors into fluid communication with the interior of said hollow outer shell.

References Cited by the Examiner

UNITED STATES PATENTS

| 2,877,288 | 3/1959 | Bollmeier | 174—76 X |
| 3,215,761 | 11/1965 | Gelpey | 174—22 X |

FOREIGN PATENTS 783,307    9/1957   Great Britain.

OTHER REFERENCES

Thomas: German ptd. application No. 1,059,527, pub. June 18, 1959.

LEWIS H. MYERS, *Primary Examiner.*

H. HUBERFELD, J. F. RUGGIERO,
*Assistant Examiners.*